(12) United States Patent
Park et al.

(10) Patent No.: US 12,504,820 B1
(45) Date of Patent: Dec. 23, 2025

(54) VEHICLE OPERATOR WORKLOAD ESTIMATION SYSTEM AND METHOD

(71) Applicants: Honda Motor Co., Ltd., Tokyo (JP); Carnegie Mellon University, Pittsburgh, PA (US)

(72) Inventors: Jong Hoon Park, Pittsburgh, PA (US); Lawrence Chen, Pittsburgh, PA (US); Ian Higgins, Pittsburgh, PA (US); Zhaobo Zheng, Campbell, CA (US); Shashank Kumar Mehrotra, Campbell, CA (US); Kevin Salubre, San Jose, CA (US); Mohammadreza Mousaei, Pittsburgh, PA (US); Steven Willits, Pittsburgh, PA (US); Blaine Levedahl, San Louis Obispo, CA (US); Timothy Buker, Morro Bay, CA (US); Eliot Xing, Pittsburgh, PA (US); Teruhisa Misu, San Jose, CA (US); Sebastian Scherer, Pittsburgh, PA (US); Jean Oh, Pittsburgh, PA (US); Kumar Akash, San Jose, CA (US)

(73) Assignees: Honda Motor Co., Ltd., Tokyo (JP); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/900,337

(22) Filed: Sep. 27, 2024

(51) Int. Cl.
| | |
|---|---|
| *G06F 3/01* | (2006.01) |
| *G06F 3/041* | (2006.01) |
| *G06V 10/80* | (2022.01) |
| *G06V 40/10* | (2022.01) |

(52) U.S. Cl.
CPC .............. *G06F 3/015* (2013.01); *G06F 3/013* (2013.01); *G06F 3/014* (2013.01); *G06F 3/041* (2013.01); *G06V 10/811* (2022.01); *G06V 40/10* (2022.01); *G06F 2203/04105* (2013.01)

(58) Field of Classification Search
CPC .......... G06F 3/015; G06F 3/013; G06F 3/014; G06F 3/041; G06F 2203/04105; G06V 10/811; G06V 40/10
See application file for complete search history.

(56) References Cited

U.S. PATENT DOCUMENTS

| | | | |
|---|---|---|---|
| 9,248,839 B1 * | 2/2016 | Tan .................... | B60K 35/80 |
| 9,946,344 B2 | 4/2018 | Ayaz et al. | |

(Continued)

OTHER PUBLICATIONS

Delisle, J.-F. (2022). Intelligent Adaptive Flight Training System—A Human Performance in the Loop for Real-Time Decision Making [Thèse de doctorat, Polytechnique Montréal]. PolyPublie. https://publications.polymtl.ca/10551/ (Year: 2022).*

(Continued)

*Primary Examiner* — Bryan Earles
(74) *Attorney, Agent, or Firm* — Rankin, Hill & Clark LLP

(57) ABSTRACT

An estimation system includes a plurality of sensors that generate a multimodal signal, where the multimodal signal indicates a state of a user. The estimation system also includes at least one processor that receives the multimodal signal from the plurality of sensors, and determines a workload experienced by the user based on the multimodal signal and a workload model, wherein the workload model relates multimodal signal data to an experienced workload.

20 Claims, 10 Drawing Sheets

(56) References Cited

U.S. PATENT DOCUMENTS

| | | | | |
|---|---|---|---|---|
| 2005/0030184 | A1* | 2/2005 | Victor | B60W 50/087 |
| | | | | 340/576 |
| 2007/0063854 | A1* | 3/2007 | Zhang | B60W 40/09 |
| | | | | 340/576 |
| 2015/0351641 | A1* | 12/2015 | Kang | A61B 5/4058 |
| | | | | 600/301 |
| 2016/0375910 | A1* | 12/2016 | McMillen | B62D 1/046 |
| | | | | 701/36 |

OTHER PUBLICATIONS

Andrea Alaimo, Antonio Esposito, Calogero Orlando, and Andre Simoncini, "Aircraft pilots workload analysis: heart rate variability objective measures and nasa-task load index subjective evaluation," Aerospace, vol. 7, No. 9, pp. 137, 2020.

Bradley M Appelhans and Linda J Luecken, "Heart rate variability as an index of regulated emotional responding," Review of general psychology, vol. 10, No. 3, pp. 229-240, 2006.

Hasan Ayaz, Meltem Izzetoglu, Patricia A Shewokis, and Banu Onaral, "Sliding-window motion artifact rejection for functional near-infrared spectroscopy," in 2010 Annual International Conference of the IEEE Engineering in Medicine and Biology. IEEE, 2010, pp. 6567-6570.

Rohan Baijal, Jay Patrikar, Brady Moon, Sebastian Scherer, and Jean Oh, "Xplaneros: Ros wrapper for autonomous fixed wing applications," Sep. 2021.

Douglas Bates, Martin Maechler, Ben Bolker, Steven Walker, Rune Haubo Bojesen Christensen, Henrik Singmann, Bin Dai, Gabor Grothendieck, Peter Green, and M Ben Bolker, "Package 'lme4'," convergence, vol. 12, No. 1, pp. 2, 2015.

Vernoi Battiste and Michael Bortolussi, "Transport pilot workload: A comparison of two subjective techniques," in Proceedings of the Human Factors Society Annual Meeting. SAGE Publications Sage CA: Los Angeles, CA, 1988, vol. 32, pp. 150-154.

BETA Technologies, "Alia vtol," https://www.beta.team/aircraft/, 2022.

Joshua Bhagat Smith, Prakash Baskaran, and Julie A Adams, "Decomposed physical workload estimation for human-robot teams," in 2022 IEEE 3rd International Conference on Human-Machine Systems (ICHMS). IEEE, 2022, pp. 1-6.

Deborah A Boehm-Davis, John G Casali, Brian M Kleiner, Jeffrey A Lancaster, Jason J Saleem, and Kathryn Wochinger, "Pilot performance, strategy, and workload while executing approaches at steep angles and with lower landing minima," Human factors, vol. 49, No. 5, pp. 759-772, 2007.

Gianluca Borghini, Laura Astolfi, Giovanni Vecchiato, Donatella Mattia, and Fabio Babiloni, "Measuring neurophysiological signals in aircraft pilots and car drivers for the assessment of mental workload, fatigue and drowsiness," Neuroscience & Biobehavioral Reviews, vol. 44, pp. 58-75, 2014.

Mickaël Causse, Zarrin K Chua, and Florence Rémy, "Influences of age, mental workload, and flight experience on cognitive performance and prefrontal activity in private pilots: a fnirs study," Scientific reports, vol. 9, No. 1, pp. 7688, 2019.

Cynthia S Cycyota and David A Harrison, "What (not) to expect when surveying executives: A meta-analysis of top manager response rates and techniques over time," Organizational Research Methods, vol. 9, No. 2, pp. 133-160, 2006.

Philippe Doyon-Poulin, Benoit Ouellette, and Jean-Marc Robert, "Effects of visual clutter on pilot workload, flight performance and gaze pattern," in Proceedings of the International Conference on Human-Computer Interaction in Aerospace, 2014, pp. 1-7.

Kyle Ellis and Thomas Schnell, "Eye tracking metrics for workload estimation in flight deck operation," 2010.

Anja K Faulhaber, "From crewed to single-pilot operations: Pilot performance and workload management," in 20th International Symposium on Aviation Psychology, 2019, p. 283.

Anja K Faulhaber and Maik Friedrich, "Eye-tracking metrics as an indicator of workload in commercial single-pilot operations," in Human Mental Workload: Models and Applications: Third International Symposium, H-WORKLOAD 2019, Rome, Italy, Nov. 14-15, 2019, Proceedings 3. Springer, 2019, pp. 213-225.

Federal Aviation Administration, "Risk management handbook," https://www.faa.gov/regulationspolicies/handbooksmanuals/risk-management-handbook-faa-h-8083-2a, 2022.

Chuanyan Feng, Xiaoru Wanyan, Kun Yang, Damin Zhuang, and Xu Wu, "A comprehensive prediction and evaluation method of pilot workload," Technology and health care, vol. 26, No. S1, pp. 65-78, 2018.

Sandra G Hart, "Nasa-task load index (nasa-tlx); 20 years later," in Proceedings of the human factors and ergonomics society annual meeting. Sage publications Sage CA: Los Angeles, CA, 2006, vol. 50, pp. 904-908.

Ali Hassani and Humphrey Shi, "Dilated neighborhood attention transformer," 2023.

DB Jagdale, SC Pardeshi, and SND Coe, "Vertical take off & landing vehicles," International Research Journal of Engineering and Technology (IRJET), vol. 5, 2018.

Jitesh Jain, Jiachen Li, MangTik Chiu, Ali Hassani, Nikita Orlov, and Humphrey Shi, "Oneformer: One transformer to rule universal image segmentation," 2023.

Bernd Johannes, Stefanie Rothe, Andre Gens, Soeren Westphal, Katja Birkenfeld, Edwin Mulder, Jörn Rittweger, and Carla Ledderhos, "Psychophysiological assessment in pilots performing challenging simulated and real flight maneuvers," Aerospace medicine and human performance, vol. 88, No. 9, pp. 834-840, 2017.

Laszlo Kocsis, Peter Herman, and Andras Eke, "The modified beer-lambert law revisited," Physics in Medicine & Biology, vol. 51, No. 5, pp. N91, 2006.

Laminar Research, "Xplane 12 simulator," https://www.x-plane.com/, 2023.

Tsung-Yi Lin, Michael Maire, Serge Belongie, Lubomir Bourdev, Ross Girshick, James Hays, Pietro Perona, Deva Ramanan, C. Lawrence Zitnick, and Piotr Dollár, "Microsoft coco: Common objects in context," 2015.

Jing Liu, Alessandro Gardi, Subramanian Ramasamy, Yixiang Lim, and Roberto Sabatini, "Cognitive pilot-aircraft interface for single-pilot operations," Knowledge-based systems, vol. 112, pp. 37-53, 2016.

David G Lowe, "Distinctive image features from scale-invariant keypoints," Computer Vision, p. 91-110, 2004.

Tahira Mahboob, Aimen Ijaz, Amber Shahzad, and Muqadas Kalsoom, "Handling missing values in chronic kidney disease datasets using knn, k-means and k-medoids algorithms," in 2018 12th International Conference on Open Source Systems and Technologies (ICOSST). IEEE, 2018, pp. 76-81.

Heikki Mansikka, Kai Virtanen, and Don Harris, "Comparison of nasatlx scale, modified cooper-harper scale and mean inter-beat interval as measures of pilot mental workload during simulated flight tasks," Ergonomics, vol. 62, No. 2, pp. 246-254, 2019.

Matthew Masters and Axel Schulte, "Investigating the utility of fnirs to assess mental workload in a simulated helicopter environment," in 2020 IEEE International Conference on Human-Machine Systems (ICHMS). IEEE, 2020, pp. 1-6.

K Mohanavelu, S Poonguzhali, A Janani, and S Vinutha, "Machine learning-based approach for identifying mental workload of pilots," Biomedical Signal Processing and Control, vol. 75, pp. 103623, 2022.

Marius Muja and David G Lowe, "Fast approximate nearest neighbors with automatic algorithm configuration," pp. 331-340, 2009.

Marcus Nyström and Kenneth Holmqvist, "An adaptive algorithm for fixation, saccade, and glissade detection in eyetracking data," Behavior research methods, vol. 42, pp. 188-204, Feb. 2010.

Yuning Qiu, Carlos Busso, Teruhisa Misu, and Kumar Akash, "Incorporating gaze behavior using joint embedding with scene context for driver takeover detection," in ICASSP 2022-2022 IEEE International Conference on Acoustics, Speech and Signal Processing (ICASSP). IEEE, 2022, pp. 4633-4637.

Yoshihiro Shimomura, Takumi Yoda, Koji Sugiura, Akinori Horiguchi, Koichi Iwanaga, and Tetsuo Katsuura, "Use of frequency domain

(56) References Cited

OTHER PUBLICATIONS analysis of skin conductance for evaluation of mental workload," Journal of physiological anthropology, vol. 27, No. 4, pp. 173-177, 2008.

Christopher Silva, Wayne R Johnson, Eduardo Solis, Michael D Patterson, and Kevin R Antcliff, "Vtol urban air mobility concept vehicles for technology development," in 2018 Aviation Technology, Integration, and Operations Conference, 2018, p. 3847.

Hamed Taheri Gorji, Nicholas Wilson, Jessica VanBree, Bradley Hoffmann, Thomas Petros, and Kouhyar Tavakolian, "Using machine learning methods and eeg to discriminate aircraft pilot cognitive workload during flight," Scientific Reports, vol. 13, No. 1, pp. 2507, 2023.

Ruiqi Wang, Wonse Jo, Dezhong Zhao, Weizheng Wang, Baijian Yang, Guohua Chen, and Byung-Cheol Min, "Husformer: A multi-modal transformer for multi-modal human state recognition," 2023.

Glenn F Wilson, "An analysis of mental workload in pilots during flight using multiple psychophysiological measures," The International Journal of Aviation Psychology, vol. 12, No. 1, pp. 3-18, 2002.

Senwei Xiang, Anhuan Xie, Minxiang Ye, Xufei Yan, Xiaojia Han, Hongjiao Niu, Qiang Li, and Haishan Huang, "Autonomous evtol: A summary of researches and challenges," Green Energy and Intelligent Transportation, p. 100140, 2023.

Zairil Zaludin and Ezanee Gires, "Automatic flight control requirements for transition flight phases when converting long endurance fixed wing uav to vtol aircraft," in 2019 IEEE International Conference on Automatic Control and Intelligent Systems (I2CACIS). IEEE, 2019, pp. 273-278.

\* cited by examiner

TABLE I: Flight Tasks and Expected Difficulty

| ACS Ref | |
|---|---|
| IV.A | Vertical takeoff to 1600 MSL Hold position and heading 280 for 30 seconds. |
| IV.B | Maintain altitude, rotate to heading 360. Hold for 10 seconds. |
| V.A | Transition from hover to forward flight. Use full horizontal thrust until at 100 knots. Then turn off vertical thrust. Maintain heading and altitude. |
| V.C | Climb to 3000 feet at 80 knots using full horizontal thrust. Once at 3000 feet, accelerate to 100 knots. Maintain heading. |
| VI.B | Turn to 090 with 30 degree bank. Maintain altitude and 100 knots. |
| VI.B | Turn to 180 with 30 degree bank. Maintain altitude and 100 knots. |
| VI.C | Perform a steep turn to the right, using 45 degree bank, back to 180. Maintain altitude. |
| VI.C | Perform a steep turn to the left, using 45 degree bank, back to 180. Maintain altitude. |
| VI.C | Perform slow flight at 75 knots for 30 seconds. Maintain heading 180 at 3000 feet. |
| VI.B | Transition back to vertical flight. Pull back on horizontal thrust all the way and set vertical speed to 0. Maintain heading 180 at 3000 feet. |
| VI.B | Hold heading and position for 30 seconds. |
| V.C | Fly back to KAGC. Follow the blue heading bug. |
| V.A, V.D | Descend to 2300 feet. Enter left traffic pattern for runway 28. |
| V.D, V.E | Hover over runway 28 markers at 1600 feet. Land vertically full stop. |
| IV.A, IV.C | Takeoff vertically and hover at 1300 feet. Air taxi to front of tower. Then return to runway 28. Stay above the taxiway while air taxiing. |
| V.B | Hover on the centerline of runway 28, maintaining heading 280 and 1300 feet, for 30 seconds. Then land. |
| IV.A | Maintain altitude, rotate to heading 180. Hold for 10 seconds. |
| IV.B | Maintain altitude, rotate to heading 090. Hold for 10 seconds. |
| V.E, II.D | Land. Taxi on the ground to the front of tower. Then return to runway 28. |
| V.B | Perform a short field rolling takeoff, using vertical thrusters if necessary. Enter left traffic pattern and set up for approach on runway 28. |
| V.E | Perform rolling landing touch and go on runway 28. |
| V.H | Transition back to vertical flight Land between two adjacent hangars at KAGC. |
| V.H | Takeoff in this confined area, air taxi to front of tower and land full stop. |

FIG. 5A

TABLE I: Flight Tasks and Expected Difficulty

| Expected Difficulty | Survey Group | Task Group | Flight Group |
|---|---|---|---|
| 3 | 1 | 1 | A |
| 3 | 1 | 1 | A |
| 4 | 1 | 2 | A |
| 3 | 1 | 3 | A |
| 3 | 1 | 3 | A |
| 3 | 1 | 3 | A |
| 4 | 2 | 4 | A |
| 4 | 2 | 4 | A |
| 4 | 2 | 4 | A |
| 5 | 2 | 5 | A |
| 3 | 2 | 6 | A |
| 3 | 2 | 6 | A |
| 4 | 3 | 7 | A |
| 5 | 3 | 7 | A |
| 6 | 4 | 8 | B |
| 6 | 4 | 8 | B |
| 3 | 4 | 9 | B |
| 3 | 4 | 9 | B |
| 6 | 4 | 10 | B |
| 5 | 5 | 11 | C |
| 5 | 5 | 11 | C |
| 6 | 5 | 12 | C |
| 5 | 5 | 13 | C |

FIG. 5B

VEHICLE OPERATOR WORKLOAD ESTIMATION SYSTEM AND METHOD

BACKGROUND

In recent years, the flexibility of vertical take-off and landing (VTOL) aircraft has made these vehicles popular in development, research, and operation. When compared to traditional fixed-wing aircraft and rotorcraft, VTOLs bring unique challenges as they combine many maneuvers from both types of aircraft. Pilot workload is an important factor for safe and efficient operation of VTOLs. Consequently, there is demand for a system capable of active workload monitoring in vehicles such as VTOLs, and determining a perceived workload in a corresponding user.

BRIEF DESCRIPTION

According to one aspect, an estimation system includes a plurality of sensors that generate a multimodal signal, where the multimodal signal indicates a state of a user. The estimation system also includes at least one processor that receives the multimodal signal from the plurality of sensors, and determines a workload experienced by the user based on the multimodal signal and a workload model, where the workload model relates multimodal signal data to an experienced workload.

According to another aspect, a computer-implemented method of determining experienced workload includes generating a multimodal signal using a plurality of sensors, where the multimodal signal indicates a state of a user. The method also includes transmitting the multimodal signal from the plurality of sensors to at least one processor. The method also includes determining a workload experienced by the user based on the multimodal signal and a workload model using a machine learning algorithm executed by the at least one processor, where the workload model relates multimodal signal data to an experienced workload.

BRIEF DESCRIPTION OF THE DRAWINGS

FIG. 5A is a first portion of a table of predetermined flight tasks.

FIG. 5B is a second portion of a table of predetermined flight tasks.

DETAILED DESCRIPTION

Figure 1:
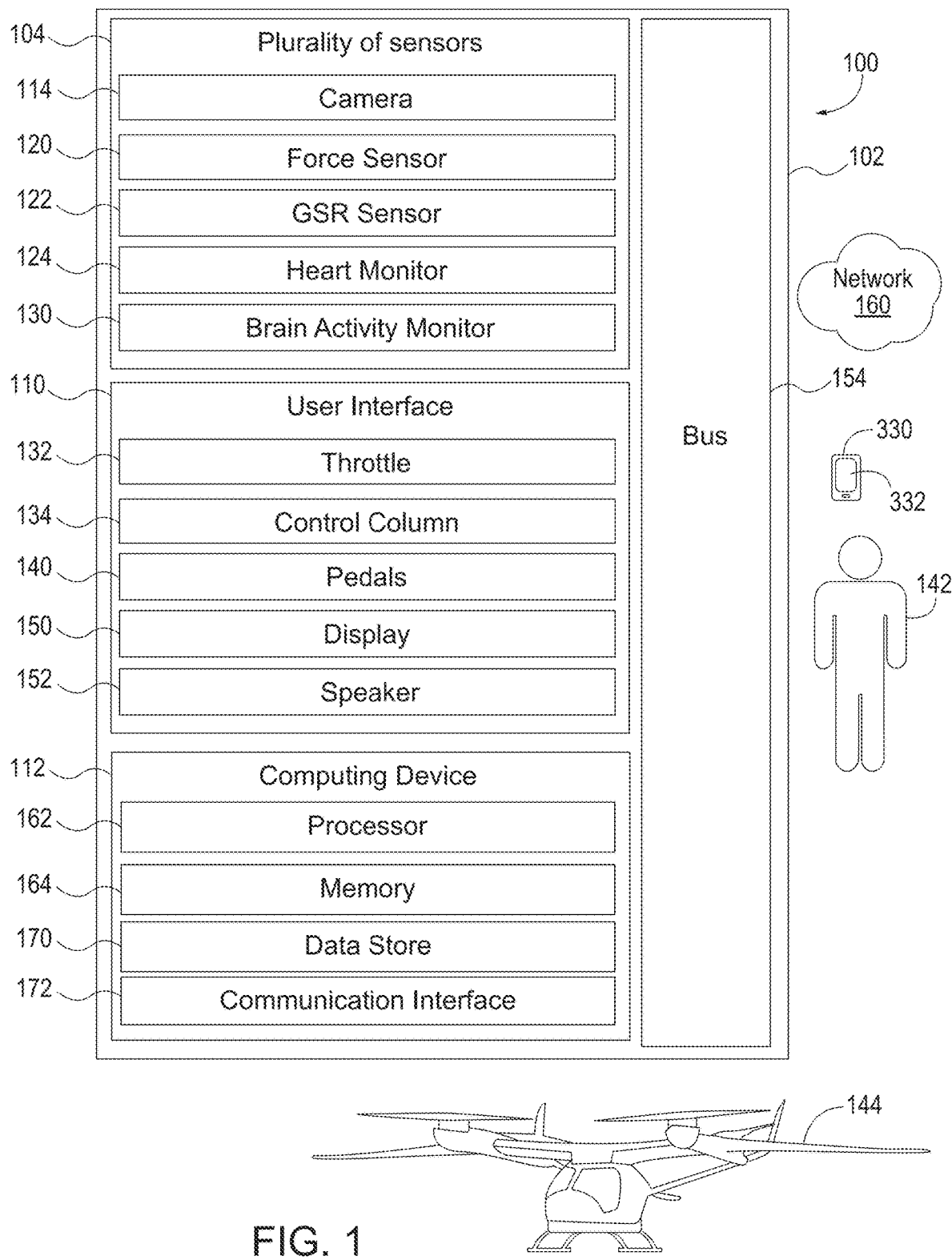
FIG. 1 is an exemplary operating environment of an estimation system for determining workload experienced by a user.

The systems and methods disclosed herein are configured to identify and estimate a workload experienced by a user in a vehicle simulation based on a multimodal signal generated by a plurality of sensors. The multimodal signal indicates a variety of physiological data and behavior information of the user collected during the simulation that may be used to develop a workload model for determining a degree of workload experienced by the user. A vehicle system incorporating the plurality of sensors and the workload model is configured to simulate a vertical take-off and landing (VTOL) aircraft and determine a degree of workload experienced by a pilot as the user, indicating at least one of stress and fatigue of the pilot during the simulation.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Mobile device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein may include, but is not limited to, a computing device component (e.g., a processor) with circuitry that may be worn or attached to user. In other words, a wearable computing device is a computer that is subsumed into the personal space of a user. Wearable computing devices may include a display and may include various sensors for sensing and determining various parameters of a user. For example, location, motion, and physiological parameters, among others. Exemplary wearable computing devices may include, but are not limited to, watches, glasses, clothing, gloves, hats, shirts, jewelry, rings, earrings necklaces, armbands, leashes, collars, shoes, earbuds, headphones and personal wellness devices.

System Overview

Referring now to the drawings, the drawings are for purposes of illustrating one or more exemplary embodiments and not for purposes of limiting the same. FIG. 1 is an exemplary component diagram of an operating environment 100 of an estimation system 102 including a plurality of sensors 104, a user interface 110, and a computing device 112. The plurality of sensors 104 includes a camera 114, a force sensor 120, a galvanic skin response (GSR) sensor 122, a heart monitor 124, and a brain activity sensor 130. The user interface 110 includes a throttle 132, a control column 134, and pedals 140 that are each actuated by a user 142 as a control mechanism to operate a vehicle 144. The user interface 110 also includes a display 150 and a speaker 152 that may collectively generate audiovisual indications to the user 142. In this manner, the display 150 and the speaker 152 indicate a state and related information to the user 142.

The plurality of sensors 104, the user interface 110, the computing device 112, and components thereof may be interconnected by a bus 154. The components of the operating environment 100, as well as the components of other systems, hardware architectures, and software architectures discussed herein, may be combined, omitted, or organized into different architectures for various embodiments.

The computing device 112 may be implemented as a part of the estimation system 102 or another device, e.g., a remote server (not shown), connected via a network 160. The computing device 112 may be capable of providing wired or wireless computer communications utilizing various protocols to send and receive electronic signals internally to and from components of the operating environment 100. Additionally, the computing device 112 may be operably connected for internal computer communication via the bus 154 (e.g., a Controller Area Network (CAN) or a Local Interconnect Network (LIN) protocol bus) to facilitate data input and output between the computing device 112 and the components of the operating environment 100.

The computing device 112 includes a processor 162, a memory 164, a data store 170, and a communication interface 172, which are each operably connected for computer communication via the bus 154. The communication interface 172 provides software and hardware to facilitate data input and output between the components of the computing device 112 and other components, networks, and data sources described herein.

The estimation system 102 is configured to determine a workload experienced by the user 142 based on a multimodal signal generated by the plurality of sensors 104 and received by the computing device 112. The multimodal signal indicates an overall state of the user 142 captured by the plurality of sensors 104 during the simulation. In this regard, the camera 114, the force sensor 120, the GSR sensor 122, the heart monitor 124, and the brain activity sensor 130 input different modalities to the computing device 112 as parts of the multimodal signal.

Figure 2:
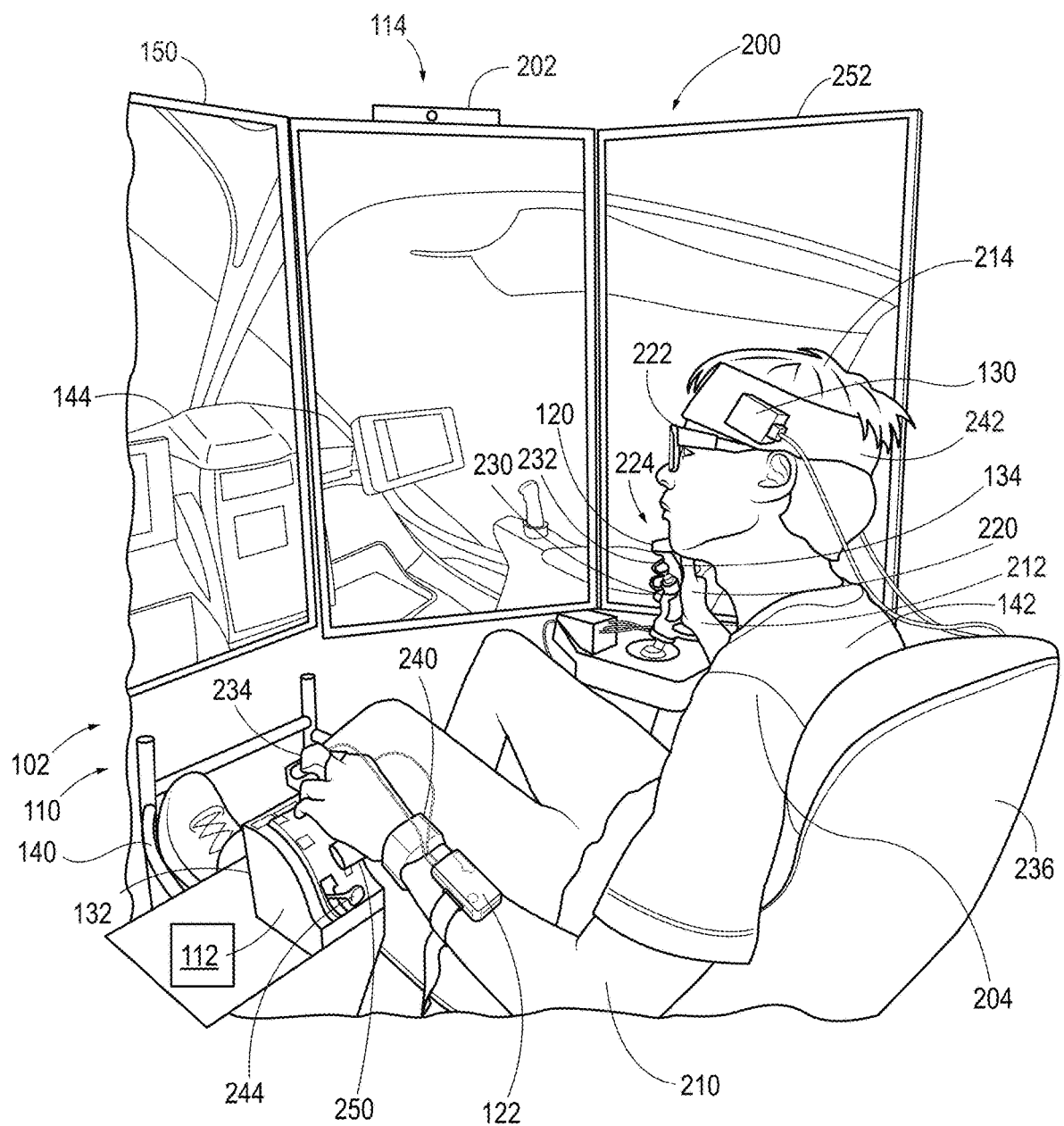
FIG. 2 is a perspective view of the user interacting with a simulation system incorporating the estimation system.

FIG. 2 depicts an embodiment of the estimation system 102 incorporated in a simulation system 200, where the vehicle 144 is a simulation supported by the computing device 112. As depicted, the vehicle 144 is a Beta Technologies ALIA-250 electric vertical take-off and landing (VTOL) aircraft. The vehicle 144 has four (4) vertical propellers and one (1) horizontal propeller controlled by the user 142.

The simulation system 200 employs XPlaneROS as an X-Plane wrapper application for extracting aircraft data from the simulation system 200 and feeding control commands to control the vehicle 144. With this construction, the simulation system 200 collects flight control inputs made by the user 142 through the control mechanisms of the user interface 110, as well as spatio-temporal positions and orientations of the vehicle 144 during the simulation.

As shown in FIG. 2, the camera 114 generates image data of the user 142 during a simulation including the vehicle 144 while the user 142 engages the user interface 110. The image data generated by the camera 114 indicates an eye gaze, a body pose, gaze semantics, and a response time of the user 142 in the estimation system 102. The image data also indicates operation of control mechanisms in the user interface 110 by the user 142 and elements depicted on the display 150.

During the simulation, the computing device 112 is configured to cause an event in the simulation that elicits response by the user 142, and determine the response time by the user 142 to the event based on the image data generated by the camera 114. The camera 114 transmits the image data to the computing device 112 as part of the multimodal signal.

In the depicted embodiment, the camera 114 includes a Kinect V2 motion sensor 202 mounted on the display 150 to capture specific patterns and behaviors across various task workload levels performed by the user 142. Upper body joints of the user 142, including shoulders 204, elbows 210, wrists 212, and a head 214 of the user 142, are the primary moving parts when operating aircraft as hands 220 control the control column 134 and the throttle 132, while the head 214 constantly scans in and around the vehicle 144 for points of interest. The motion sensor 202 is configured to capture this action by the user 142 as the image data, and transmit the image data to the computing device 112 as part of the multimodal signal.

The camera 114 also includes eye tracking glasses 222 with integrated IR-LED emitters and micro-cameras. The eye tracking glasses 222 include a front-facing scene camera with a 106° field of view that captures a point of view of the user 142 during the simulation. During recording by the eye tracking glasses 222, each frame is annotated with 2D coordinates of the gaze of the user 142, discussed in greater detail below. The eye tracking glasses 222 are configured to transmit information from the integrated sensors as the image data, and transmit the image data to the computing device 112 as part of the multimodal signal.

While, as depicted, the camera 114 includes the motion sensor 202 and the eye tracking glasses 222, the estimation system 102 may additionally or alternatively include a plurality of cameras that have similar features and function in a similar manner as the camera 114 for generating image data of the user 142 during the simulation, including cameras supported on various elements of the estimation system 102 such as the user interface 110. Also, the estimation system 102 may additionally or alternatively include optical, infrared, or other cameras, light detection and ranging (LiDAR) systems, position sensors, proximity sensors, ultrasonic sensors, and a variety of other non-contact sensors and sensor combinations as the camera 114 for monitoring user behavior without departing from the scope of the present disclosure.

With continued reference to FIG. 2, the force sensor 120 is supported on the control column 134, where the user 142 grips the control column 134 to operate the vehicle 144 depicted on the display 150. The force sensor 120 generates force data during the simulation as part of the multimodal signal. The force data indicates a grip force exerted by the user 142 on the control column 134 during the simulation. The force sensor 120 transmits the force data to the computing device 112 as part of the multimodal signal.

The force sensor 120 is formed from force-sensitive resistor strips 224 provided on the control column 134, where the force data generated by the force sensor 120 is a detected electrical resistance of the force-sensitive resistor strips 224. The force-sensitive resistor strips 224 include a first resistor strip 230 and a second resistor strip 232 disposed on the control column 134. The first resistor strip 230 and the second resistor strip 232 each generate the force data included in the multimodal signal.

The first resistor strip 230 and the second resistor strip 232 are arranged offset from each other, and within a single grip position on the control column 134. With this construction, the first resistor strip 230 and the second resistor strip 232 are configured to detect grip forces exerted by different portions of a hand of the user 142 at a same time. As such, the force data generated by the first resistor strip 230 and the second resistor strip 232 includes relatively detailed information regarding grip on the control column 134 by the user 142. Notably, tactile information on the control mechanisms of the user interface 110 detected by the force sensor 120 may be strongly related to maneuvers by the user 142 and the vehicle 144, which is a strong indicator of physical workload by the user 142.

While, in the depicted embodiment, the force-sensitive resistor strips 224 include the first resistor strip 230 and the second resistor strip 232, the force-sensitive resistor strips 224 may include more or fewer resistor strips for detecting a grip force by the user 142. Also, while the force sensor 120 is formed from the force-sensitive resistor strips 224, the force sensor 120 may additionally or alternatively include strain gages, load cells, and a variety of other contact sensors and sensor combinations supported in the control column 134. Also, the estimation system 102 may additionally or alternatively include the force sensor 120 supported on the throttle 132 and the pedals 140 without departing from the scope of the present disclosure.

With continued reference to FIG. 2, the GSR sensor 122 is worn by the user 142 and generates skin conductance data as part of the multimodal signal. The skin conductance data generated by the GSR sensor 122 indicates a conductance of skin of the user 142 at the GSR sensor 122 during the simulation.

The GSR sensor 122 is a Shimmer GSR+ device having two electrodes 234 that direct an electric current along the skin of the user 142 to generate the skin conductance data. The electrodes 234 are respectively attached to index and middle fingers of one hand of the user 142. Notably, the GSR response detected by the GSR sensor 122 reflects sweat gland activity by the user 142, specifically at the hands 220. Such sweat gland activity at the hands 220, and consequently the associated GSR information generated by the GSR sensor 122 strongly correlates with arousal and mental workload by the user 142 during the simulation.

The estimation system 102 includes a seat 236 that accommodates the user 142 controlling the vehicle using the control mechanisms of the user interface 110, including the throttle 132. The throttle 132 is arranged at a left side of the seat 236, and the electrodes 234 are worn by the user 142 on the left hand 220. As such, the GSR sensor 122 is worn by the user 142 at a hand corresponding to the throttle 132.

In many circumstances of operating the vehicle 144, the user 142 actuates the throttle 132 less often, and less intensely than the control column 134. With this construction, the electrodes 234 worn on the left hand 220 are less likely to experience movement during the simulation, and the data generated by the GSR sensor 122 at the electrodes 234 is relatively unaffected by movement of the user 142 as compared to the right hand 220. While, as depicted, the GSR sensor 122 is worn on fingers of the user 142, the GSR sensor 122 may additionally or alternatively be worn on other portions of the skin of the user 142 to generate the skin conductance data without departing from the scope of the present disclosure.

With continued reference to FIG. 2, the heart monitor 124 is worn by the user 142 and generates heart rate data as part of the multimodal signal. The heart monitor 124 is an Empatica E4 wristband 240 wrapped around a left wrist of the user 142. The wristband 240 uses photoplethysmography (PPG) to measure blood volume pulse (BVP), heart rate (HR), and interbeat interval (IBI). The wristband 240 also measures body temperature and wrist acceleration by the user 142. The heart rate data generated by the heart monitor 124 may indicate each of the PPG, BVP, HR, and IBI of the user 142 during the simulation.

The wristband 240 is configured to transmit the heart rate data to the computing device 112 as part of the multimodal signal. While, as depicted, the heart monitor 124 is worn on a wrist of the user 142, the heart monitor 124 may additionally or alternatively be worn on other portions of the user 142 for generating the heart rate data, such as the fingers, an arm, a leg, and a chest.

The brain activity sensor 130 is worn by the user 142 and generates brain activity data as part of the multimodal signal. The brain activity data generated by the brain activity sensor 130 indicates brain activity by the user 142 during the simulation.

With continued reference to FIG. 2, the brain activity sensor 130 is a BIOPAC functional near-infrared spectroscopy (fNIRS) headband 242. The headband 242 is a fNIRS optical brain imaging sensor worn on the head 214 of the user 142.

The headband 242 uses 4 infrared light emitters, 10 detectors, and 18 optodes to noninvasively measure oxygen levels in a prefrontal cortex of the user 142. Compared to data produced by electroencephalography (EEG), fNIRS is less invasive and more comfortable for the user 142 with comparable prediction power. Because the fNIRS headband 242 is relatively comfortable for the user 142, the headband 242 is less distracting to the user 142, and less impactful on the mental workload of the user 142 during the simulation. The brain activity sensor 130 may additionally or alternatively include an electroencephalography (EEG) sensor, or another known sensor worn by the user 142 for measuring brain activity without departing from the scope of the present disclosure.

The throttle 132 includes a first stick 244 and a second stick 250 which respectively correspond to vertical and horizontal propellers of the vehicle 144. The first stick 244 is a vertical stick that adaptively sets a rate of ascent/descent of the vehicle 144. The control column 134 is used to control a roll and pitch of the vehicle 144, while the pedals 140 control a yaw of the vehicle 144. The pedals 140 are also used to control the differential brakes of the vehicle 144, allowing the user 142 to turn and stop the vehicle 144 on ground.

Flight scenes by the simulation system 200 are rendered on screens 252 included in the display 150, resulting in a total horizontal field of view of 225 degrees. A wide field of view provided to the user 142 by the display 150 causes an immersive flying experience that gives the user 142 more situational awareness.

Figure 3:
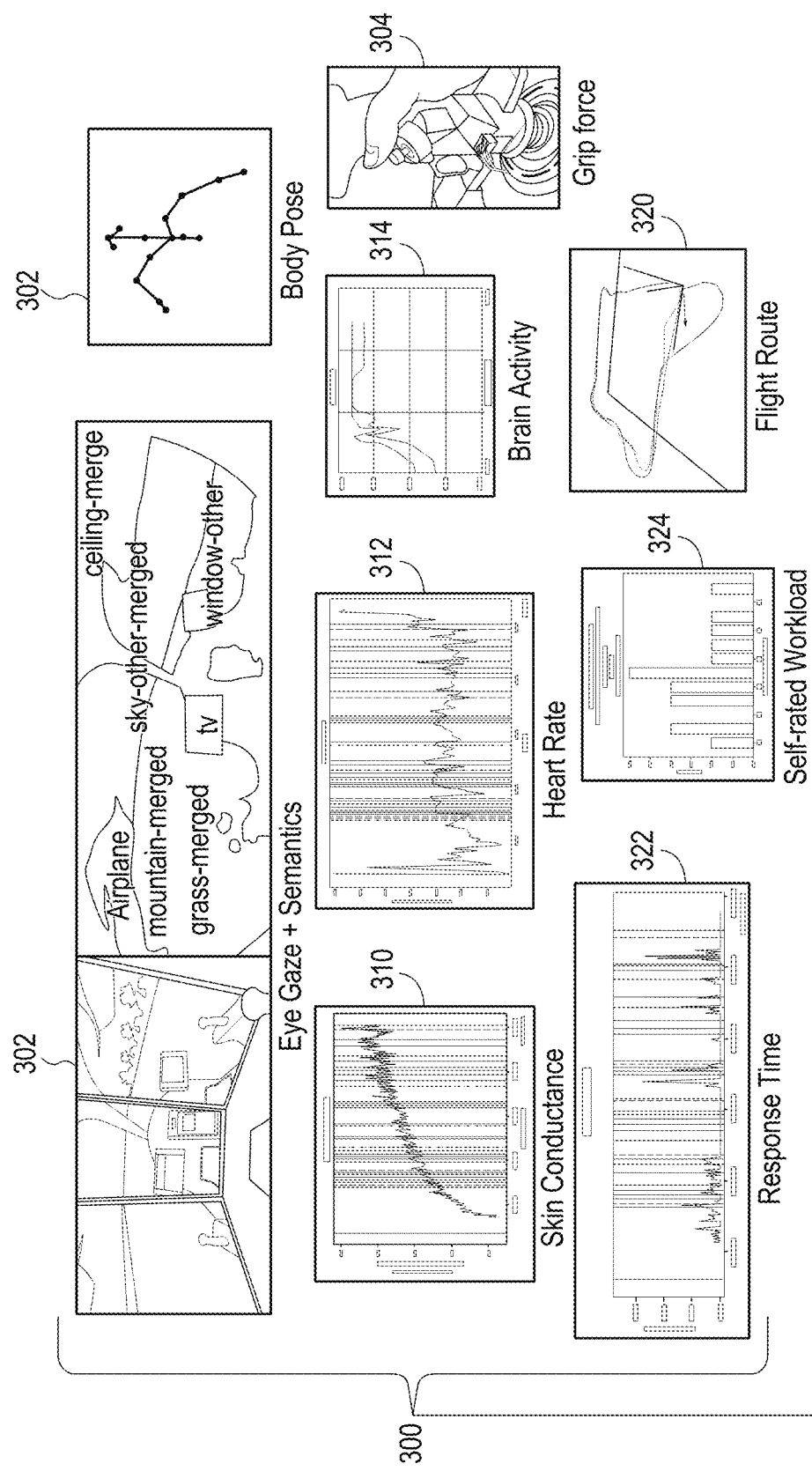
FIG. 3 is a diagram of a multimodal signal generated by a plurality of sensors included in the system.

FIG. 3 depicts sources of information included in the multimodal signal 300 processed by the computing device 112. The multimodal signal 300 includes data generated by the plurality of sensors 104, and indicates a psycho-physiological state of the user 142 during the simulation produced by the simulation system 200.

As depicted, the multimodal signal 300 includes the image data 302 generated by the camera 114 indicating the eye gaze of the user 142 and the semantics of the estimation system 102, including the control mechanisms of the user interface 110 and objects depicted on the display 150. The multimodal signal 300 also includes the image data 302 generated by the camera 114 indicating the body pose of the user 142. The multimodal signal 300 also includes the force data 304 generated by the force sensor 120, the skin conductance data 310 generated by the GSR sensor 122, the heart rate data 312 generated by the heart monitor 124, and the brain activity data 314 generated by the brain activity sensor 130.

The multimodal signal 300 further includes travel data 320 indicating a travel route performed by the vehicle 144 during the simulation, under operation by the user 142. In this manner, the vehicle 144 generates the travel data 320, which is included in the multimodal signal 300. In the depicted embodiment where the vehicle 144 is an aircraft, the travel data is flight derivative data indicating at least one of a position, a speed, and an orientation of the vehicle 144 affected by the control mechanisms of the user interface 110.

The computing device 112 is configured to determine a change in workload experienced by the user 142 along the travel route indicated in the travel data 320. In this regard, the computing device 112 determines the workload experienced by the user 142 along portions of the travel route, and determines a change in the determined workload between different portions of the travel route based on the travel data 320.

While, in the depicted embodiment, the travel data 320 indicates raw flight data by the vehicle 144, the computing device 112 may determine technical error in operations performed by the user 142, and transmit information indicating the determined technical error as part of the multimodal signal 300. In this regard, the computing device 112 receives predetermined operation information indicating a plurality of different operations to be performed by the user 142 in the vehicle 144 during the simulation, along the travel route indicated in the travel data 320.

The computing device 112 determines the travel route performed by the vehicle 144 during the simulation as the travel data 320, determines a conformity between the travel data 320 and the predetermined operation information for each operation along the travel route, and transmits the determined conformity as part of the multimodal signal 300. In this manner, the computing device 112 determines different workloads experienced by the user 142 for the plurality of different operations along the travel route based on technical error by the user 142.

The plurality of different operations performed along the travel route may include a same operation, or a same series of operations performed repeatedly. With this construction, the estimation system 102 is configured to determine a workload experienced by the user 142 due to repeated flight routines performed under a predetermined schedule. The computing device 112 may determine the workload for a plurality of consecutive operations in the plurality of operations. As such, the estimation system 102 is configured to determine an affect on workload experienced by the user 142 over time and across different operations of a single travel route.

The response time of the user 142 in the simulation, determined based on the image data 302 as described above, is recorded as response data 322 corresponding to the different operations performed by the user 142 along the travel route. The response data 322 is processed by the computing device 112 as part of the multimodal signal 300.

Examples of different operations performed by the user 142 as a pilot of the vehicle 144 include taxiing from a tower to a runway, executing vertical takeoff, transitioning to a forward flight, flying level at a predetermined altitude and heading, turning in flight, ascending, descending, entering a traffic pattern, leaving a traffic pattern, and landing. While, as depicted, the vehicle 144 is a digital VTOL aircraft, the vehicle 144 may alternatively be a variety of vehicles including a plane, glider, boat, car, or other user operated vehicle. In this regard, the different operations performed by the user 142 operating the vehicle 144 may additionally or alternatively include a variety of operations associated with the form and function of the vehicle 144 simulated by the simulation system. Also, the vehicle 144 may be a physical vehicle provided with the plurality of sensors 104 and the control mechanisms of the user interface 110 for determining a workload of the user 142 without departing from the scope of the present disclosure.

The travel route performed by the vehicle 144 may be compared to a predetermined travel route to determine conformity in performance by the user 142 to the predetermined travel route. With this construction, the travel route performed by the vehicle 202, and the predetermined travel route are each included in the travel data 320 as part of the multimodal signal 300 processed by the computing device 112 to determine the workload of the user 142.

The computing device 112 also receives self-rated workload data 324 from the user 142. The self-rated workload data 324 indicates a workload experienced by the user 142 during the simulation, reported by the user 142. In an embodiment, the user 142 retrospectively reports the workload experienced during the simulation, including different portions of the simulation, and the computing device 112 receives the self-rated workload data 324 reported by the user 142 after the simulation is completed. With this construction, the user 142 is relatively focused on operating the vehicle 144 during the simulation, such that providing the self-rated workload data does not affect operation of the vehicle 144, or add to the workload experienced by the user 142.

The user interface 110 records survey results from the user 142 as the self-rated workload data 324. More specifically, the user interface 110 includes a user terminal 330 (see FIG. 1) that is a mobile device configured to provide survey questions to the user 142 and receive corresponding answers through a display 332.

The computing device 112 develops a workload model based on the multimodal signal 300 and the self-rated workload data 324 using a machine learning algorithm discussed in greater detail below. More specifically, the machine learning algorithm is trained on the multimodal signal 300 with the self-rated workload data 324 considered ground truth information.

The user terminal 330 transmits the self-rated workload data 324 to the computing device 112. In an embodiment, the computing device 112 receives the self-rated workload data 324 from the user terminal 330 as part of the multimodal signal 300.

Figure 4:
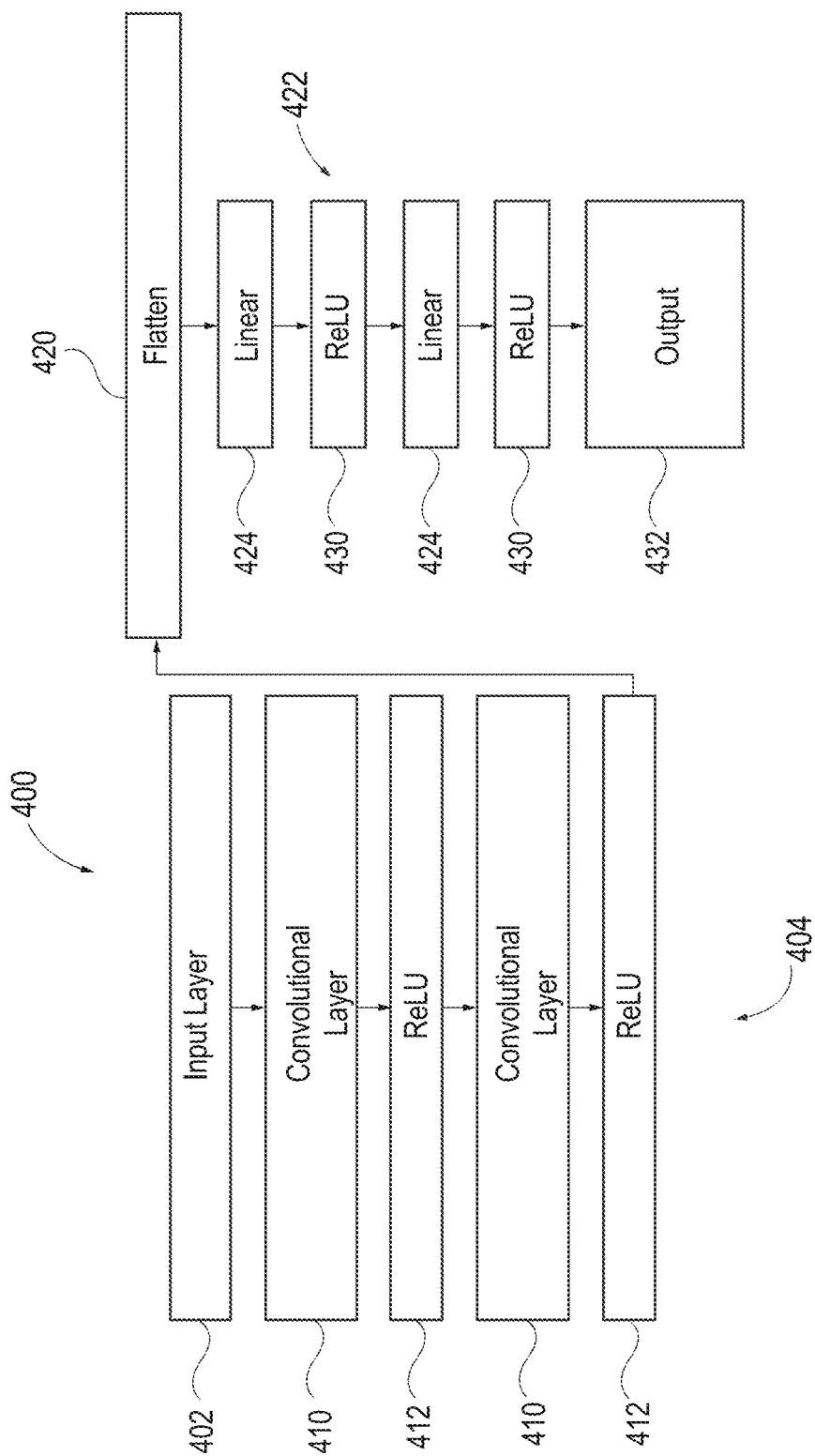
FIG. 4 is a diagram of a machine learning algorithm.

FIG. 4 depicts a machine learning algorithm 400 executed by the computing device 112 for processing the multimodal signal 300. The machine learning algorithm 400 includes a neural network (NN) having an input layer 402 that receives the multimodal signal 300. The input layer 402 receives each of the image data 302, the force data 304, the skin conductance data 310, the heart rate data 312, the brain activity data 314, the travel data 320, the response data 322, and the self-rated workload data 324 as parts of the multimodal signal 300.

The NN includes a set 404 of alternating convolutional layers 410 and rectified linear units 412 that receives information from the input layer 402. In this regard, the input layer 402 processes and transmits the multimodal signal 300 to a first convolutional layer 414 in the set, where the multimodal signal 300 is subsequently processed by subsequent alternating rectified linear units 412 and convolutional layers 410. The set 404 of alternating convolutional layers 410 and rectified linear units 412 reduce spatial dimensions of the multimodal signal 300 from the input layer 402 by extracting features from different spatial locations of the multimodal signal 300, and form a hierarchical representation of data in the multimodal signal 300 for determining the workload of the user 142. While, as depicted, the set 404 includes two convolutional layers 410 and two rectified linear units 412, the set 404 may include more or fewer convolutional layers 410 and rectified linear units 412 arranged in an alternating order without departing from the scope of the present disclosure.

The NN includes a flatten layer 420 that receives information from the set of alternating convolutional layers 410 and rectified linear units 412. In this regard, the set of alternating convolutional layers 410 and rectified linear units 412 process and transmit the multimodal signal 300 from the input layer 402 to the flatten layer 420.

The NN includes a set 422 of alternating linear layers 424 and rectified linear units 430 that receive information from the flatten layer 420. In this regard, the flatten layer 414 processes the multimodal signal 300 from the set 404 of alternating convolutional layers 410 and rectified linear units 412 into a linear vector, and transmits the linear vector to the set 422 of alternating linear layers 424 and rectified linear units 430. The set 422 of alternating linear layers 424 and rectified linear units 430 are fully connected and configured to process the linear vector received from the flatten layer 414. More specifically, the set 422 of alternating linear layers 424 and rectified linear units 430 are configured to determine a class of workload experienced by the user 142 during the simulation based on the information received from the flatten layer 414. While, as depicted, the set 422 includes two linear layers 424 and two rectified linear units 430, the set 422 may include more or fewer linear layers 424 and rectified linear units 430 arranged in an alternating order without departing from the scope of the present disclosure.

In an embodiment, the set 422 of alternating linear layers 424 and rectified linear units 430 determine the class of the workload at an output layer 432 as one of a high workload, a medium workload, and a low workload. The medium workload class is defined by a range of standard deviations from a mean value of workload experienced by the user 142 across the plurality of different operations. The low workload class is defined below the range of standard deviations defining the medium workload class. The high workload class is defined above the range of standard deviations defining the medium workload class.

As described, the computing device 112 develops the NN as a workload model based on the multimodal signal 300 using the machine learning algorithm 400. In this manner, the NN of the machine learning algorithm 400 relates multimodal signal data to an experienced workload. While, as depicted, the NN is a convolutional neural network, the machine learning algorithm 400 may additionally or alternatively include a variety of neural networks and learning algorithms executed by the computing device 112 to develop a workload model that relates multimodal signal data to an experienced workload as recited herein without departing from the scope of the present disclosure.

In an embodiment, developing the NN as a workload model includes dividing extracted features from the multimodal signal 300 into training and validation sets using cross-validation for each operation performed by the user 142 in the estimation system 102. The extracted features of the multimodal signal 300 include the image data 302, the force data 304, the skin conductance data 310, the heart rate data 312, the brain activity data 314, the travel data 320, the response data 322, and the self-rated workload data 324.

As such, the NN is developed based on behavior by the user 142 in the estimation system 102. The NN may be first developed based on behavior by a plurality of users in a manner similar to the user 142, and then further developed based on behavior by the user 142 in the estimation system 102. In an embodiment, the NN is developed to be generic to individual users by dividing extracted features from multimodal signals corresponding to the plurality of users from a plurality of simulations into training and validation sets.

With this construction, the computing device 112 may receive the NN as a workload model that is generic to individual users, including the user 142, and then further develop the NN according to behavior by the user 142 during the simulation indicated by the multimodal signal 300. As such, the NN may be developed towards individual users, increasing an accuracy of the NN in determining the workload experienced by the user 142.

With the NN developed as a workload model of the user 142, the computing device 112 is configured to determine the workload experienced by the user 142 based on the multimodal signal 300. The computing device 112 determines the workload to indicate effects of fatigue and stress experienced by the user 142 during the simulation.

In an embodiment, the computing device 112 determines the workload experienced by the user 142 and causes the user interface 110 to indicate the workload during the simulation. In this regard, the computing device 112 may generate a warning to the user 142 via the display 150 and the speaker 152 when the determined workload has exceeded a threshold value. The computing device 112 may additionally or alternatively transmit determined workload data to a remote server for remotely monitoring the workload experienced by the user 142.

In an embodiment, the estimation system 102 receives a predetermined route for the vehicle 144, and predicts a workload that will be experienced by the user 142 controlling the vehicle 144 along the predetermined route based on the NN as the workload model. With this construction, the estimation system 102 may be used to proactively limit an experienced workload of the user 142 operating the vehicle 144.

While, in the depicted embodiment the estimation system 102 is incorporated into the simulation system 200, the estimation system 102 may additionally or alternatively be incorporated into a physical vehicle for determining a state of the user 142 in a real world environment. In this regard, the vehicle 144 operated by the user 142 may be a physical vehicle, where the plurality of sensors 104 are disposed in a cabin of the vehicle 144 and configured to detect the state of the user 142 controlling the vehicle 144.

An experiment including the estimation system 102 was performed for evaluating an efficacy of the estimation system 102. In the experiment, a plurality of users similar to the user 142 interacted with the estimation system 102 incorporated in the simulation system 200. A physiology baseline was collected from each user for roughly 30 seconds, during which each user was instructed to stare at a dot on an otherwise empty screen 252. The baseline data was used to remove individualized differences in physiological signals such as heart rate, skin conductance, and grip force. After the baseline data collection, each user started an experimental session with predetermined flight tasks.

The predetermined flight tasks are designed to represent core aspects of VTOL commercial operations. The private powered lift airman certification standards (ACS) by the Federal Aviation Administration (FAA) is used as a guideline while designing the predetermined flight tasks, which is based on the risk management handbook by the FAA. The predetermined tasks include taxiing, vertical takeoff, transition from vertical flight to horizontal flight, maintaining altitude, climbing, turning to heading, landing in fixed-wing mode, and landing vertically.

FIGS. 5A and 5B depict Table I, which organizes the predetermined flight tasks. In this regard, three certified pilots (1 private, 1 commercial, and 1 airline) with extensive flight experiences provided ratings for the expected difficulty of the predetermined flight tasks to achieve well-distributed workload levels from the users. The pilots rated the expected task difficulty from 1 to 6, with 1 requiring only a guided mental process and 6 requiring high dynamic mental process plus dynamic physical action close to ground obstructions. Table I provides a complete list of the tasks and the expected difficulty employed in the experiment.

To avoid task order biases, the order of the flight tasks performed by the users was counter-balanced. Continuous flight simulation is advantageous for the users to have a natural and immersive experience to reflect the appropriate workload. As such, the tasks were grouped into three flights, with each flight being a continuous sequence that starts and ends at a runway. Each participant was assigned one of 6 permutations of 3 flights, so that a bias of exposure is reduced while the simulation experience stays natural.

Workload experienced by the users during flight tasks was measured through subjective self-reports provided on the user terminal 330 as the self-rated workload data 324. NASA-TLX was provided on the user terminal 330 for collecting the self-rated workload data 324. NASA-TLX is a multi-dimensional scale designed to obtain workload estimates from operators while they are performing a task or immediately afterward. Each TLX survey has 6 questions, asking the participant to rate their mental demand, physical demand, temporal demand, performance, effort, and frustration on a scale from 1-20. A Unity application is employed on the user terminal 330 so that the participants could conveniently input their answers on the user terminal 330.

With continued reference to FIGS. 5A and 5B, the experiment included a total of 23 different flight tasks. The simulation system 200 was paused during answering of NASA-TLX. As such, performing one NASA-TLX survey for each individual flight task may lead to over-surveying and inaccurate self-reports by the users. This may also break immersion of the users in the simulation system 200, which could negatively impact the realism of the simulation. To enhance immersion in the simulation, consecutive flight tasks were grouped together into a single survey if they had similar expected difficulties. Furthermore, surveys were conducted in batches, with multiple surveys conducted at each pause. The results of assigning task groups and survey points is shown in Table I.

Brain activity signals from the headband 242 are processed into the brain activity data 314 using fNIR Soft Pro software from Biopac. In this regard, a low-pass filter with a frequency threshold of 2 Hz is applied to the brain activity signals. Then, a motion artifact rejection (SMAR) is applied. The SMAR is an algorithm that uses sliding window signals from the accelerometer on the fNIRS device to level the optode readings. From the data refined using the SMAR, oxygenation information is computed through the Modified Beer Lambert Law (MBLL). The oxygenation information is incorporated into the multimodal signal 300 as the brain activity data 314.

Eye movement captured by the camera 114 can be broken down into saccades and fixations. Saccades are when gaze quickly switches from one target to another, and fixations are when the gaze is stagnant in one place. Saccadic distance tends to be shorter when pilots perceive their workload as high during flight deck operations, and vice versa. Hence, saccade and fixation information extracted from the image data 302 may be useful features and performed some calculations to extract them.

Saccades may be detected based on a velocity of gaze position and mark the current timestamp as a saccade if it exceeds a certain threshold. In the image data 302, the velocity of eye gaze at each point in time was computed, and an appropriate saccade threshold was determined by manually reviewing footage in the image data 302. The saccade event timestamps were then used to generate three new features included in the image data 302 as part of the multimodal signal 300: average saccades per second, average fixation time, and average saccade distance.

The subject of the gaze by the user may be a useful feature for workload estimation. As such, data collected from the eye tracking glasses 222 was processed with a pre-trained image segmentation model to determine what each user was looking at throughout the experiment. In this regard, the eye tracking glasses 222 produced a video from the point of view of the user, along with estimated gaze coordinates for each frame. These measurements were used to compute the corresponding gaze positions in the screen recording of the flight performed by the vehicle 144.

Next, OneFormer, a transformer-based image segmentation model was used to perform semantic segmentation on every frame of each recorded simulation video in the image data 302, for each user. Specifically, OneFormer pretrained with COCO 2017 on DiNAT backbones, and semantic and panoptic classes of COCO 2017 were used to perform the segmentation in the experiment.

Figure 6:
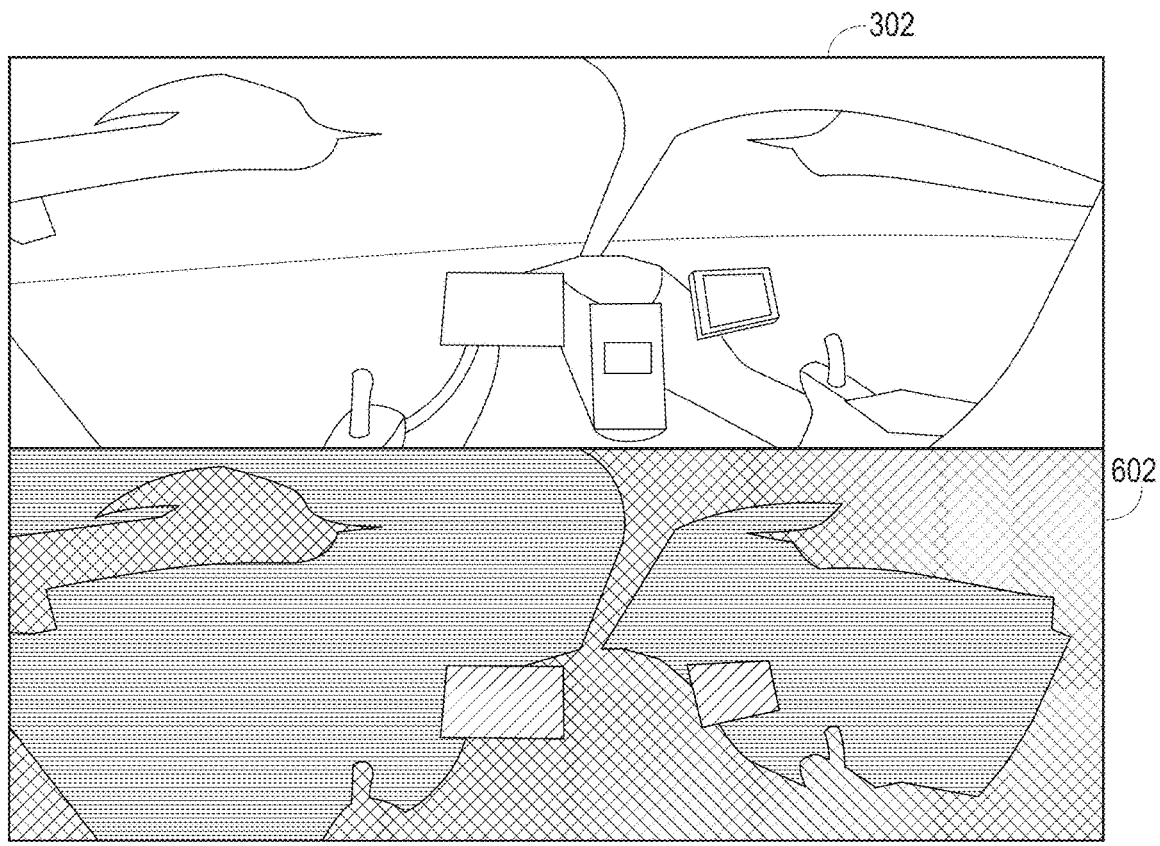
FIG. 6 is a perspective view of a simulation supported by the simulation system, and a corresponding semantic segmentation image.

FIG. 6 depicts a comparison of the simulation 600 produced by the simulation system 200, and a semantic segmentation image 602 produced using the OneFormer model. Some segmentations in the semantic segmentation image 602 were defined manually.

When the eye gaze of the user is located at an intersection of multiple objects, a semantics priority weighting algorithm is employed to determine which object is receiving most attention from the user. In this regard, semantic classes collected from the segmented frames were grouped into eight semantic groups with priority scores: Monitors (10), Roads (7), Buildings (7), Water (5), Sky (4), Ground (4), Airframe (2), and Inside (1). For each eye gaze in the video frame, semantic groups of 121 pixels in a circular shape from the center of the gaze were extracted.

The weights were summed up over each class and normalized to obtain a probability distribution over the semantic classes, as may be expressed with the following equation (1):

$$W_{annotation} = \exp\left(\frac{priority}{3}\right) - 1 \tag{1}$$

With reference to equation (1) above, the computed probability distribution is included in the image data 302 as part of the multimodal signal 300.

Figure 7:
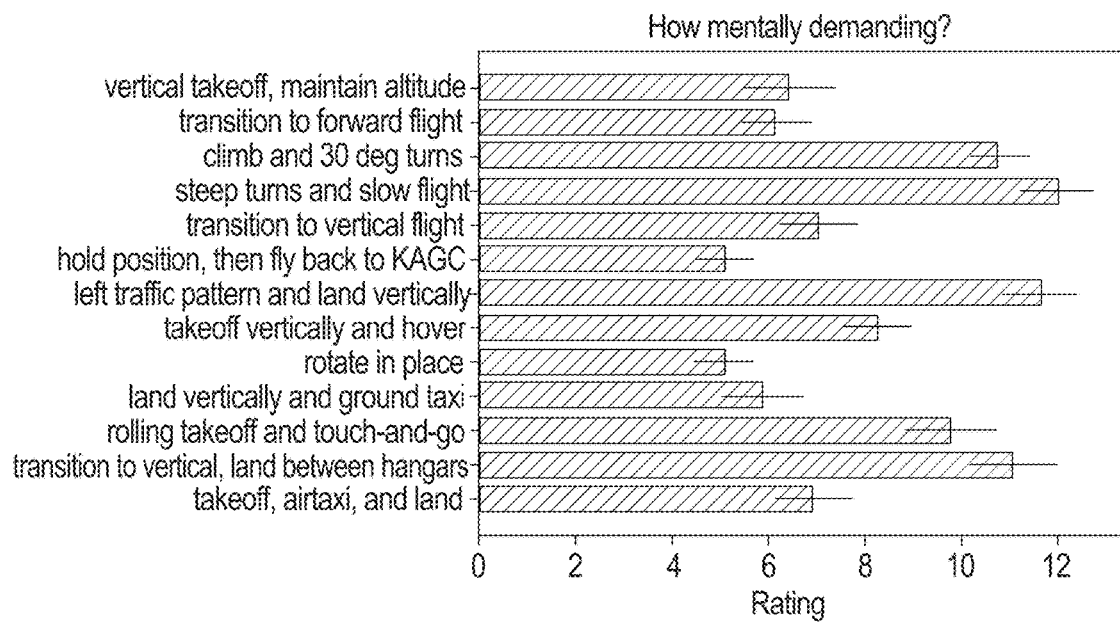
FIG. 7 is a chart of survey results from a plurality of users interacting with the simulation system.

A distribution of mental demand across all users for each task in the experiment was analyzed. FIG. 7 depicts the self-rated workload data 324 from the users, who rated mental demand on a scale from 1-20 in the NASA-TLX survey.

As shown in FIG. 7, on average, the tasks requiring the least mental demand were "hold position, then fly back to KAGC" and "takeoff vertically and hover," which were rated by the users at around 5. The most difficult tasks were "steep turns and slow flight" and "left traffic pattern and land vertically," which were rated at around 12. These results show a wide breadth of task difficulty in the experiment.

As a baseline and sanity check, participant mental demand was predicted using only the pre-screened expected task difficulties. For each user, mental demand was classified on each task as being one of low, medium, and high. Tasks with mental demand within 0.6 standard deviations from the mean were classified as medium, and the rest were classified as low or high based on which side of the mean the tasks were on. Similarly, the pre-screened expected difficulties were used to categorize tasks as easy when a corresponding rating was 1-2, medium when a corresponding rating was 3-4, and hard when a corresponding rating was 5-6.

Figure 8:
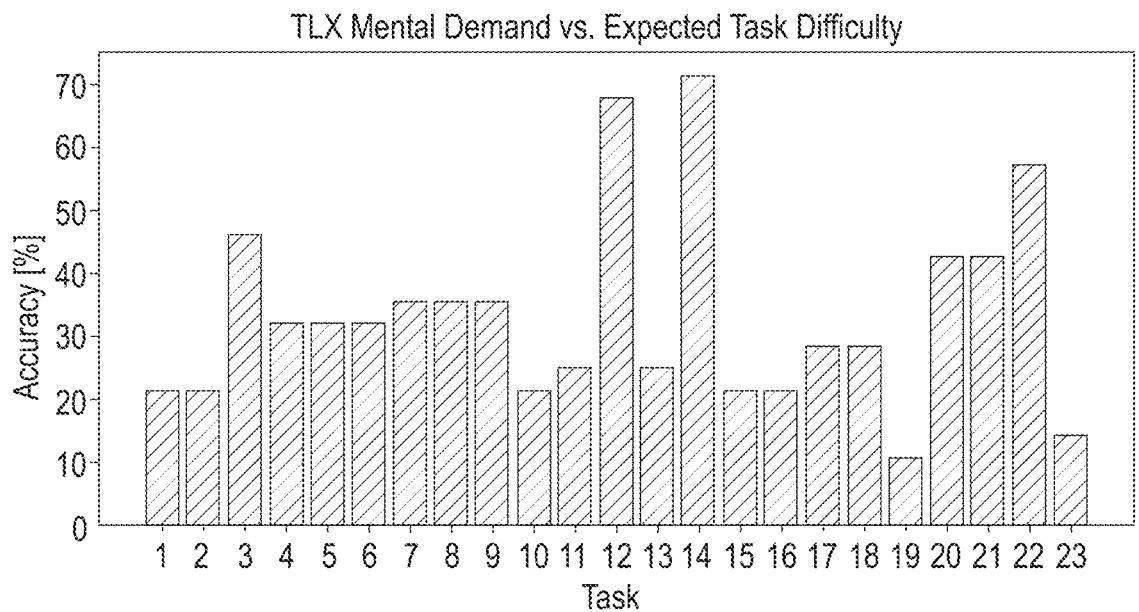
FIG. 8 is a chart comparing survey results supporting self-rated workload data, and pre-screened expected difficulties of the predetermined flight tasks.

FIG. 8 depicts a comparison between survey results supporting the self-rated workload data 324, and the pre-screened expected difficulties. As shown in FIG. 8, an assumption that expected easy tasks would result in low mental demand, expected medium tasks would result in medium mental demand, and expected hard tasks would result in high mental demand gave accuracy below 40% for most tasks in the experiment. As such, anticipated difficulty was not a reliable indicator of experienced workloads by the users.

Aggregated measurements from the plurality of sensors 104 are input to the NN with each modality included in the multimodal signal 300. The NN outputs one of three classes describing an estimated workload of the user: low, medium, or high. For each modality in the multimodal signal 300, the mean, standard deviation, minimum, and maximum of the measured values across each task are computed. To account for individual differences, normalized versions of the mean, minimum, and maximum based on measurements across the entire experiment were also computed. A subset of these aggregated measurements to include as input to the models was chosen manually.

To compute the labels, the NASA-TLX mental demand responses were first standardized across all tasks for each participant. The mean score of the mental demand responses was calculated. A threshold for low workload is set as 0.6 standard deviations below the mean, and a threshold for high workload is set as 0.6 standard deviations above the mean.

For generalized applications of the estimation system 102, a single model is trained to be applicable across all users. In this regard, the computing device 112 receives a plurality of multimodal signals, including the multimodal signal 300, where each of the multimodal signals indicate a state of one of a plurality of users. The computing device 112 develops the workload model to estimate workload of a user based on the multimodal signals that indicate the state of other users, and based on the survey results from the other users.

To achieve this, data from the experiment was split into training/validation sets across participants. 5-fold cross validation across users was performed, resulting in 22 pilots in the training set and 6 pilots in the validation set for each fold. Validation accuracy was averaged across the 5 folds. A plurality of machine learning algorithms, including linear discriminant analysis (LDA), support vector machine (SVM), random forest (RF), and XGBoost were tested. The balanced accuracies of these models were 42%, 48%, 51%, and 51%, respectively. As such, the best-performing model was XGBoost, which achieved approximately 51% accuracy across the 3 classes.

In a practical setting, users may conduct a few test flights to calibrate a workload model specifically designed to estimate the workload for that particular user. For such individualized models, a single participant is chosen as a target and their extracted features are divided over task boundaries into training and validation sets using 5-fold cross-validation. The training set of the target participant was upsampled and combined with a training set derived from every other user. Notably, the upsampling incentivizes the model to specialize on the target user by exposing it to a larger volume of their data.

Overall possible target users, an average of around 63% balanced accuracy was achieved with this method. This features a boost in accuracy of 12% compared to the generalized model.

Figure 9:
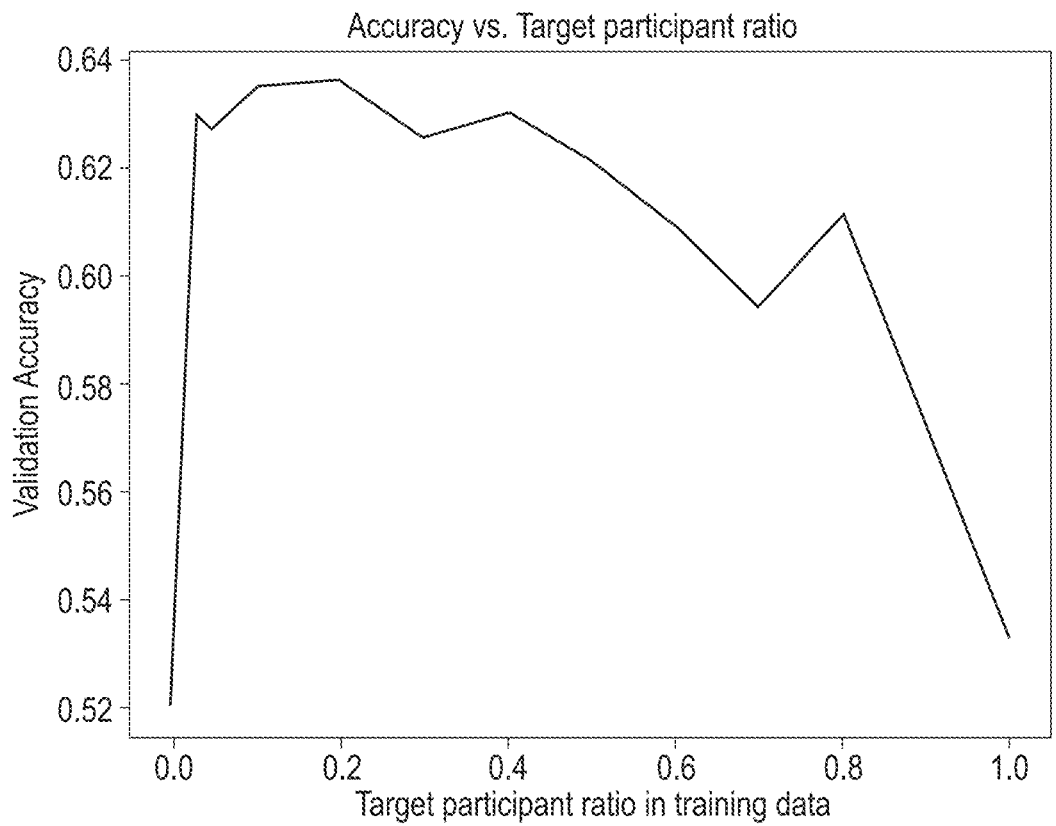
FIG. 9 is a graph that indicates model accuracy as a function of an amount of upsampling.

FIG. 9 depicts a chart that tracks model accuracy as a function of an amount of upsampling. With reference to FIG. 9, when there is no data from the target user, the individualized model is only able to achieve around 52% accuracy, which roughly matches the generalized model case. As a proportion of data from the target user is increased, the model accuracy quickly increases. In this regard, adding more data from the target user initially helps the model specialize on them. When too much of the training set is owned by the target user, the model starts to overfit, which explains the later dropoff in accuracy.

In order to identify which sensors were the most predictive, an ablation study was performed on the sensing modalities to determine which were the best indicators of mental workload. For each modality, the modality was removed as an input in the multimodal signal 300 and a resulting decrease in validation accuracy was observed.

Figure 10:
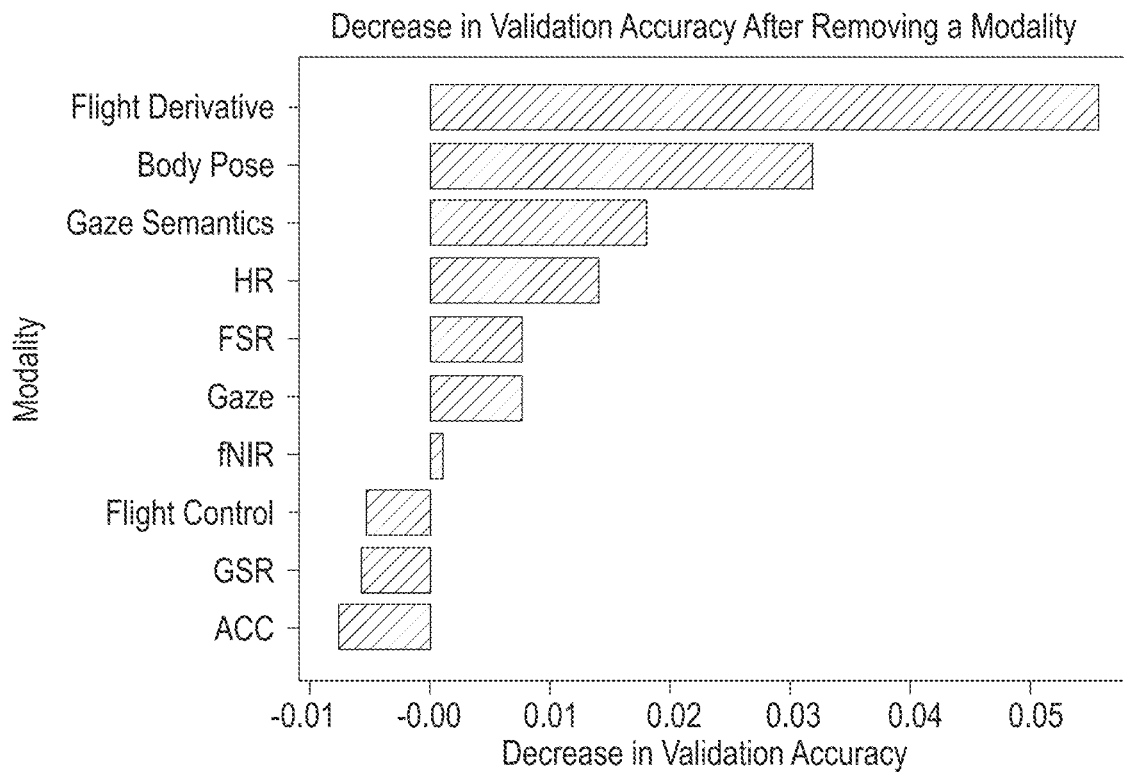
FIG. 10 is a chart of results from an ablation study of different modalities in the multimodal signal.

FIG. 10 depicts results of the ablation study. As depicted in FIG. 10, the most important modalities were flight derivative and body pose. Notably, flight control, GSR, and ACC (wrist acceleration) had a negative impact on performance by the model. Flight derivative information is directly related to flight maneuver tasks and contains rich information for mental workload. The results of the ablation study also indicate HR and gaze to be relatively predictive, with fNIRS and GSR being less important.

The results of the ablation study also indicate that body pose, grip force, and gaze semantics all provide strong prediction power for workload estimation. Notably, body pose and grip force are related to user flight maneuvers and physical workload.

The gaze semantics information conveys which types of objects the pilots were focusing on. In this regard, users tend to stare at the screens 252 during low workload cruising, but scanned their surroundings rapidly during high-workload landing tasks.

Methods for Determining User Workload in a Simulation System

Figure 11:
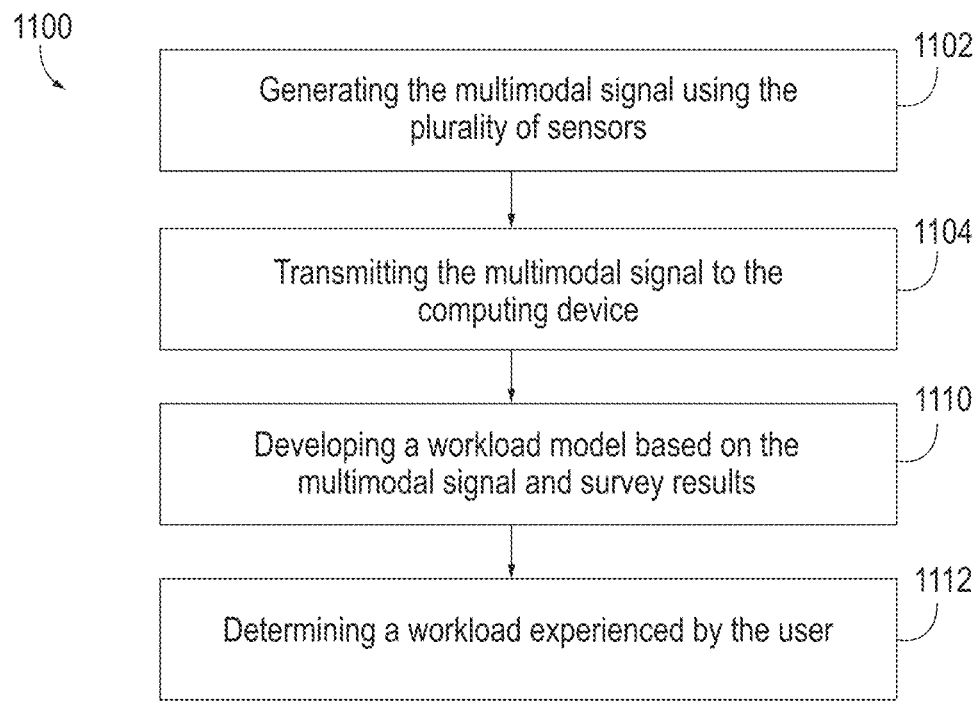
FIG. 11 is an exemplary process flow for determining workload experienced by the user.

Referring to FIG. 11, a computer-implemented method for determining the workload experienced by the user 142 with the estimation system 102 will be described according to an exemplary embodiment. FIG. 11 will be described with reference to FIGS. 1-10. For simplicity, the method 1100 will be described as a sequence of blocks, but the elements of the method 1100 may be organized into different architectures, elements, stages, and/or processes.

At block 1102, the method 1100 includes generating the multimodal signal 300 using the plurality of sensors 104, where the multimodal signal 300 indicates a state of the user 142. In an embodiment, generating the multimodal signal 300 includes generating the image data 302 of the user 142, where the image data 302 indicates at least one of an eye gaze, gaze semantics, a body pose, and a response time of the user 142 as part of the multimodal signal 300. In an embodiment, generating the multimodal signal 300 includes generating travel data 320 with the vehicle 144 operated by the user 142, and incorporating the travel data 320 into the multimodal signal 300. In the embodiment, the vehicle 144 is an aircraft, and the travel data 320 is flight derivative data indicating at least one of a position, a speed, and an orientation of the vehicle 144.

At block 1104, the method 1100 includes transmitting the multimodal signal 300 from the plurality of sensors 104 to the computing device 112.

At block 1104, the method 1110 includes developing a workload model. Developing the workload model at block 1104 incudes recording survey results from the user 142, and developing the workload model based on the multimodal signal 300 and the survey results using the machine learning algorithm 400.

At block 1112, the method 1100 includes determining a workload experienced by the user 142 based on the multimodal signal 300 and the workload model using the machine learning algorithm 400 executed by the computing device 112, where the workload model relates multimodal signal data to an experienced workload.

Figure 12:
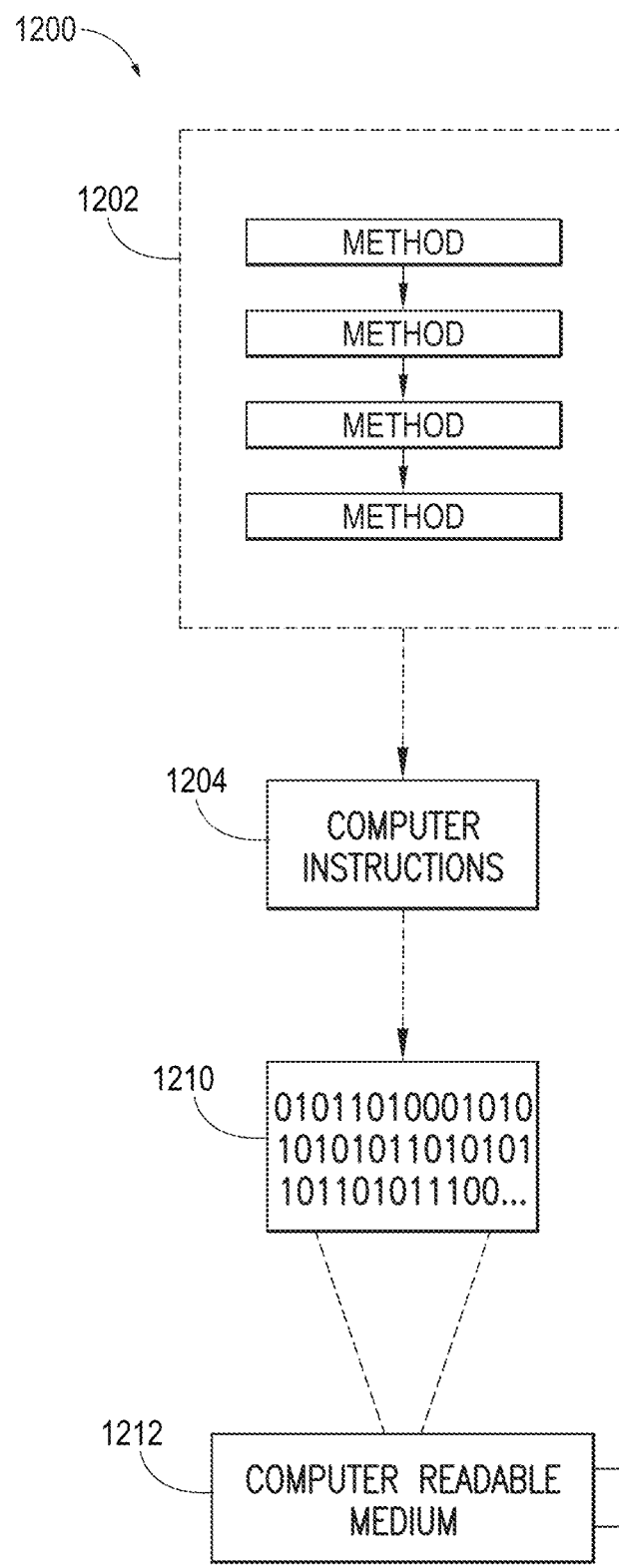
FIG. 12 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 12, where an implementation 1200 includes a computer-readable medium 1202, such as a CD-R, DVD-R, flash drive, a platter of a hard disk drive, etc., on which is encoded computer-readable data 1204. This encoded computer-readable data 1204, such as binary data including a plurality of zero's and one's as shown in 1204, in turn includes a set of processor-executable computer instructions 1210 configured to operate according to one or more of the principles set forth herein. In this implementation 1200, the processor-executable computer instructions 1210 may be configured to perform a method 1212, such as the method 1100 of FIG. 11. In another aspect, the processor-executable computer instructions 1210 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An estimation system comprising:
   a plurality of sensors that generate a multimodal signal, wherein the multimodal signal indicates a state of a user; and
   at least one processor that:
   receives the multimodal signal from the plurality of sensors; and
   determines a workload experienced by the user based on the multimodal signal and a workload model, wherein the workload model relates multimodal signal data to an experienced workload,
   wherein the multimodal signal includes travel data indicating a predetermined travel route to be performed by a vehicle,
   wherein the at least one processor further:
   receives predetermined operation information indicating a plurality of different predetermined operations to be performed by the user in the vehicle along the predetermined travel route;
   receives actual operation information indicating a plurality of different actual operations performed by the user in the vehicle along the predetermined travel route;
   determines a conformity between the predetermined operation information and the actual operation information for each operation along the predetermined travel route; and
   determines an effect on the workload experienced by the user along the predetermined travel route based on the determined conformity as part of the multimodal signal.

2. The system of claim 1, further comprising a user interface that records survey results from the user, wherein the at least one processor develops the workload model based on the multimodal signal and the survey results using a machine learning algorithm; and
   determines the workload experienced by the user based on the multimodal signal and the workload model using the machine learning algorithm,
   wherein the user interface includes a user terminal that is a mobile device configured to provide survey questions to the user and receive corresponding answers through a display, and the user terminal transmits self-rated workload data to the at least one processor.

3. The system of claim 1, further comprising at least one user interface that records survey results from a plurality of users including the user and other users, wherein the at least one processor:
   receives a plurality of multimodal signals, including the multimodal signal, wherein each of the multimodal signals indicate a state of one of the plurality of users; and
   develops the workload model based on the multimodal signals that indicate the state of the other users, and based on the survey results from the other users.

4. The system of claim 1, further comprising a control column that is a control mechanism actuated by the user to operate the vehicle, wherein the plurality of sensors includes a force sensor supported on the control column, the force sensor generates force data as part of the multimodal signal, and the force data indicates a grip force by the user on the control column.

5. The system of claim 4, wherein the force sensor includes a first resistor strip and a second resistor strip disposed on the control column,
   the first resistor strip and the second resistor strip each generate the force data included in the multimodal signal, and
   the first resistor strip and the second resistor strip are arranged within a single grip position on the control column.

6. The system of claim 1, wherein the plurality of sensors includes a camera that generates image data of the user, wherein the image data indicates at least one of an eye gaze, gaze semantics, a body pose, and a response time of the user as part of the multimodal signal.

7. The system of claim 1, further comprising:
   a throttle that is actuated by the user to operate the vehicle; and
   a seat that accommodates the user controlling the vehicle using the throttle,
   wherein the throttle is positioned at a side of the seat, and the plurality of sensors includes a galvanic skin response (GSR) sensor worn by the user at a hand corresponding to the throttle, wherein the GSR sensor generates skin conductance data as part of the multimodal signal, and the skin conductance data indicates a conductance of skin of the user controlling the vehicle.

8. The system of claim 1, wherein the plurality of sensors includes:
   a heart monitor worn by the user, wherein the heart monitor generates heart rate data as part of the multimodal signal, and the heart rate data indicates a heart rate of the user; and
   a brain activity sensor worn by the user, wherein the brain activity sensor generates brain activity data as part of the multimodal signal, and the brain activity data indicates brain activity by the user.

9. The system of claim 1, further comprising a control mechanism actuated by the user to operate the vehicle, wherein the vehicle generates the travel data that is included in the multimodal signal.

10. The system of claim 9, wherein the vehicle is an aircraft, and the travel data is flight derivative data indicating at least one of a position, a speed, and an orientation of the vehicle affected by the control mechanism.

11. The system of claim 9, wherein the vehicle is a simulation supported by the at least one processor, and the multimodal signal indicates a state of the user during the simulation.

12. The system of claim 9, wherein the control mechanism is at least one of a control column, a throttle, and a pedal, and the vehicle is a vertical takeoff and landing aircraft operated by the control mechanism.

13. The system of claim 9, wherein the at least one processor receives the predetermined route for the vehicle, and predicts a workload experienced by the user controlling the vehicle along the predetermined route based on the workload model.

14. The system of claim 1, wherein the at least one processor generates a notification to at least one of the user and a remote server when the determined workload experienced by the user exceeds a threshold value.

15. The system of claim 1, wherein the plurality of sensors are disposed in the vehicle and configured to detect the state of the user controlling the vehicle.

16. A computer-implemented method of determining experienced workload, the method comprising:
generating a multimodal signal using a plurality of sensors, wherein the multimodal signal indicates a state of a user;
transmitting the multimodal signal from the plurality of sensors to at least one processor; and
determining a workload experienced by the user based on the multimodal signal and a workload model using a machine learning algorithm executed by the at least one processor, wherein the workload model relates multimodal signal data to an experienced workload, and
the method further comprising:
generating travel data with a vehicle operated by the user, the travel data indicating a predetermined travel route to be performed by a vehicle and incorporating the travel data into the multimodal signal;
receiving predetermined operation information indicating a plurality of different predetermined operations to be performed by the user in the vehicle along the predetermined travel route;
receiving actual operation information indicating a plurality of different actual operations performed by the user in the vehicle along the predetermined travel route;
determining a conformity between the predetermined operation information and the actual operation information for each operation along the predetermined travel route; and
determining an effect on the workload experienced by the user along the predetermined travel route based on the determined conformity as part of the multimodal signal.

17. The method of claim 16, further comprising:
recording survey results from the user; and
developing the workload model based on the multimodal signal and the survey results using the machine learning algorithm.

18. The method of claim 16, further comprising generating image data of the user, wherein the image data indicates at least one of an eye gaze, gaze semantics, a body pose, and a response time of the user as part of the multimodal signal.

19. The method of claim 16, wherein the vehicle is an aircraft, and the travel data is flight derivative data indicating at least one of a position, a speed, and an orientation of the vehicle.

20. A non-transitory computer readable storage medium storing instructions that, when executed by a computer having a processor, causes the processor to perform a method, the method comprising:
generating a multimodal signal using a plurality of sensors, wherein the multimodal signal indicates a state of a user;
receives the multimodal signal from the plurality of sensors to at least one processor; and
determining a workload experienced by the user based on the multimodal signal and a workload model using a machine learning algorithm executed by the at least one processor, wherein the workload model relates multimodal signal data to an experienced workload, and
the method further comprising:
generating travel data with a vehicle operated by the user, the travel data indicating a predetermined travel route to be performed by a vehicle and incorporating the travel data into the multimodal signal;
receiving predetermined operation information indicating a plurality of different predetermined operations to be performed by the user in the vehicle along the predetermined travel route;
receiving actual operation information indicating a plurality of different actual operations performed by the user in the vehicle along the predetermined travel route;
determining a conformity between the predetermined operation information and the actual operation information for each operation along the predetermined travel route; and
determining an effect on the workload experienced by the user along the predetermined travel route based on the determined conformity as part of the multimodal signal.

* * * * *